(12) United States Patent
Ohashi

(10) Patent No.: US 12,547,240 B2
(45) Date of Patent: Feb. 10, 2026

(54) INFORMATION PROCESSING APPARATUS, METHOD, PROGRAM, AND INFORMATION PROCESSING SYSTEM

(71) Applicant: Sony Interactive Entertainment Inc., Tokyo (JP)

(72) Inventor: Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/788,232

(22) Filed: Jul. 30, 2024

(65) Prior Publication Data

US 2024/0393868 A1 Nov. 28, 2024

Related U.S. Application Data

(63) Continuation of application No. 18/001,094, filed as application No. PCT/JP2021/022794 on Jun. 16, 2021, now Pat. No. 12,086,302.

(30) Foreign Application Priority Data

Jun. 23, 2020 (JP) ................................ 2020-107907
Sep. 10, 2020 (JP) ................................ 2020-152094

(51) Int. Cl.
*G06F 3/01* (2006.01)
*A63F 13/52* (2014.01)
(Continued)

(52) U.S. Cl.
CPC .............. *G06F 3/011* (2013.01); *A63F 13/52* (2014.09); *A63F 13/55* (2014.09); *A63F 13/577* (2014.09);
(Continued)

(58) Field of Classification Search
CPC .......... G06F 3/011; G06F 3/014; G06F 3/017; A63F 13/52; A63F 13/55; A63F 13/577;
(Continued)

(56) References Cited

U.S. PATENT DOCUMENTS 9,911,232 B2 3/2018 Shapira
10,834,361 B2 11/2020 Sakai
(Continued)

FOREIGN PATENT DOCUMENTS

JP 6203369 B1 9/2017
JP 2019535054 A 5/2019
(Continued)

OTHER PUBLICATIONS

International Search Report for corresponding PCT Application No. PCT/JP2021/022794, 6 pages, Jul. 13, 2021.

*Primary Examiner* — Robert J Michaud
(74) *Attorney, Agent, or Firm* — Kilpatrick Townsend & Stockton LLP

(57) ABSTRACT

An information processing apparatus of the present invention includes an acquisition unit that acquires space information indicative of a position of a physical object in a first space around a first user, a space construction unit that constructs, on a basis of the space information, a shared space in which movements of the first user and a second user who exists in a second space different from the first space are reflected, and a determination unit that determines a position of the second user in the shared space.

13 Claims, 9 Drawing Sheets

(51) Int. Cl.
*A63F 13/55* (2014.01)
*A63F 13/577* (2014.01)
*A63F 13/60* (2014.01)
*G06T 19/20* (2011.01)
*A63F 13/213* (2014.01)
*A63F 13/25* (2014.01)
*G02B 27/01* (2006.01)

(52) U.S. Cl.
CPC .............. *A63F 13/60* (2014.09); *G06T 19/20* (2013.01); *A63F 13/213* (2014.09); *A63F 13/25* (2014.09); *G02B 27/017* (2013.01); *G06F 3/014* (2013.01); *G06F 3/017* (2013.01); *G06T 2219/024* (2013.01); *G06T 2219/2016* (2013.01)

(58) Field of Classification Search
CPC ........ A63F 13/60; A63F 13/213; A63F 13/25; G06T 19/20; G06T 2219/024; G06T 2219/2016; G02B 27/017
See application file for complete search history.

(56) References Cited

U.S. PATENT DOCUMENTS

| | | | |
|---|---|---|---|
| 11,043,033 B2 | 6/2021 | Ichikawa | |
| 11,263,813 B2 | 3/2022 | Ohashi | |
| 11,361,518 B2 | 6/2022 | Kim | |
| 2010/0169799 A1 | 7/2010 | Hyndman | |
| 2011/0216060 A1 | 9/2011 | Weising | |
| 2017/0256096 A1 | 9/2017 | Faaborg | |
| 2017/0326457 A1 | 11/2017 | Tilton | |
| 2017/0372499 A1 | 12/2017 | Lalonde | |
| 2018/0060333 A1 | 3/2018 | Bosch | |
| 2018/0373323 A1 | 12/2018 | Ghanchi | |
| 2020/0051336 A1* | 2/2020 | Ichikawa | G06T 19/006 |
| 2020/0086208 A1 | 3/2020 | Chapman | |
| 2020/0098173 A1* | 3/2020 | McCall | G06F 3/011 |
| 2020/0195889 A1 | 6/2020 | Sakai | |
| 2021/0058397 A1 | 2/2021 | Shuster | |
| 2021/0090329 A1 | 3/2021 | Ohashi | |
| 2021/0227178 A1 | 7/2021 | Lyon | |
| 2021/0240262 A1 | 8/2021 | Fajt | |
| 2022/0368858 A1 | 11/2022 | Valli | |
| 2022/0404899 A1 | 12/2022 | Suzuki | |
| 2024/0094866 A1 | 3/2024 | Lemay | |

FOREIGN PATENT DOCUMENTS

| | | |
|---|---|---|
| JP | 2020074108 A | 5/2020 |
| JP | 2021047720 A | 3/2021 |
| WO | 2018092384 A1 | 5/2018 |
| WO | 2018193687 A1 | 10/2018 |

* cited by examiner

FIG.2
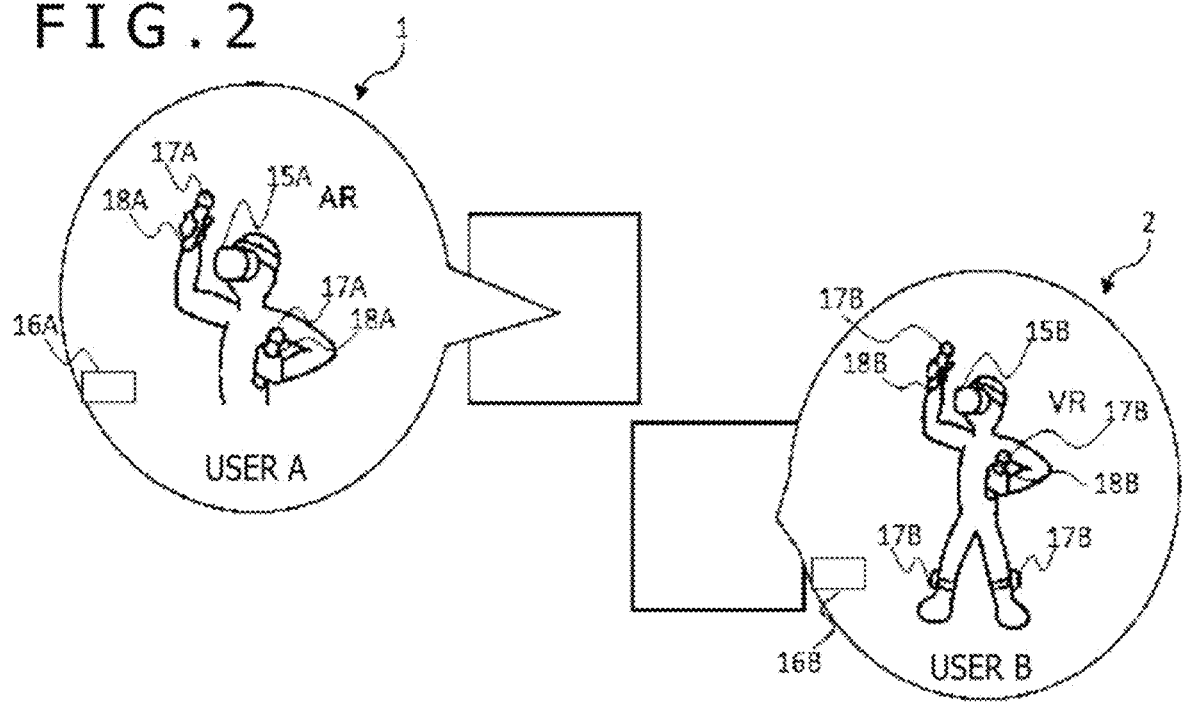
FIG.3
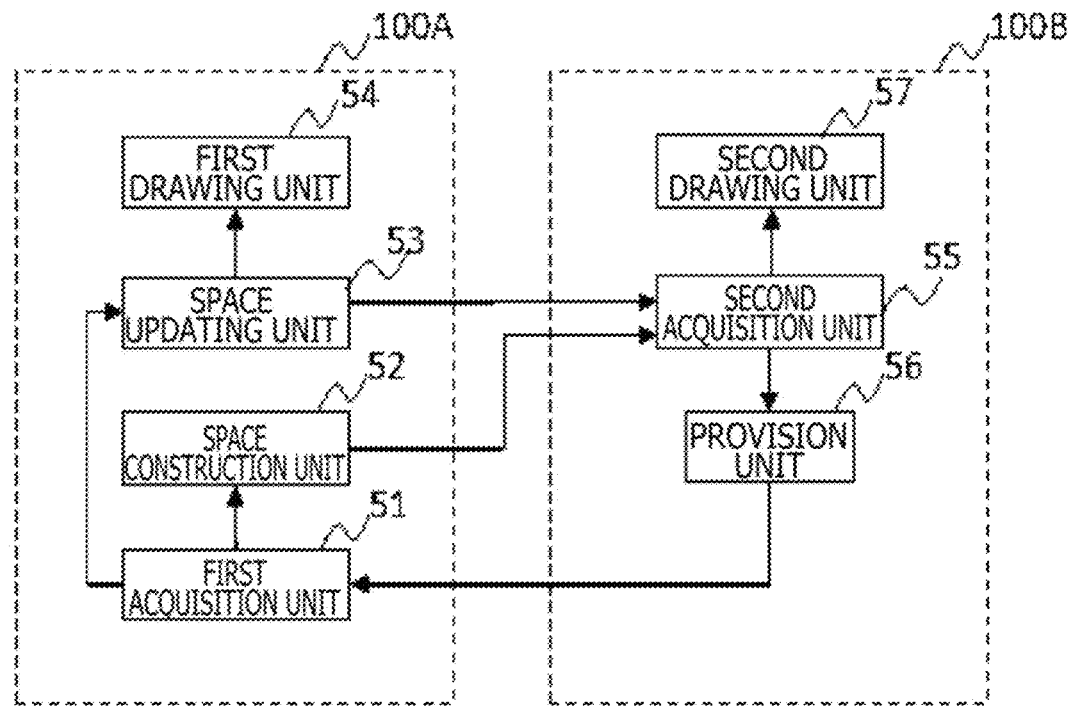

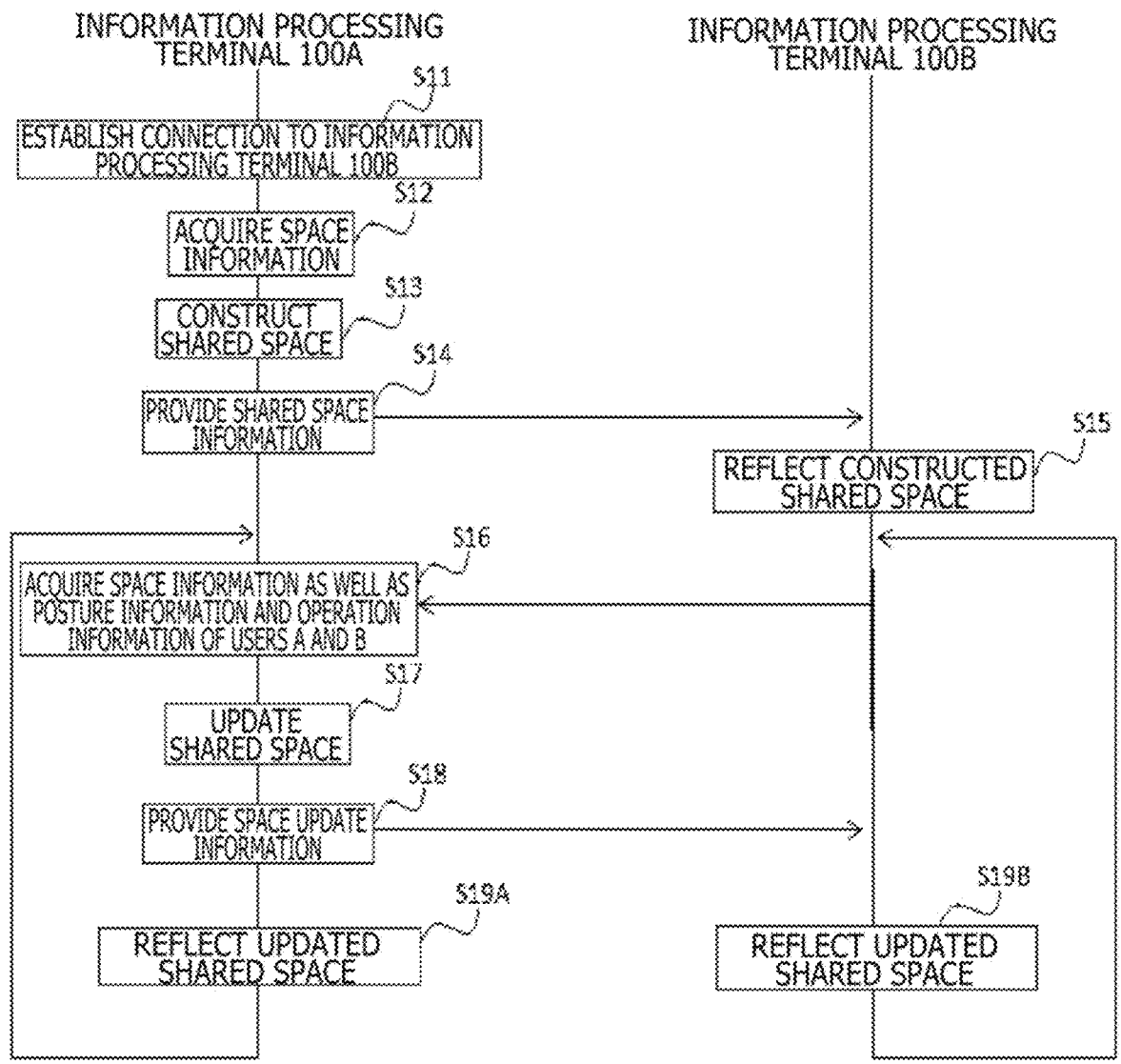
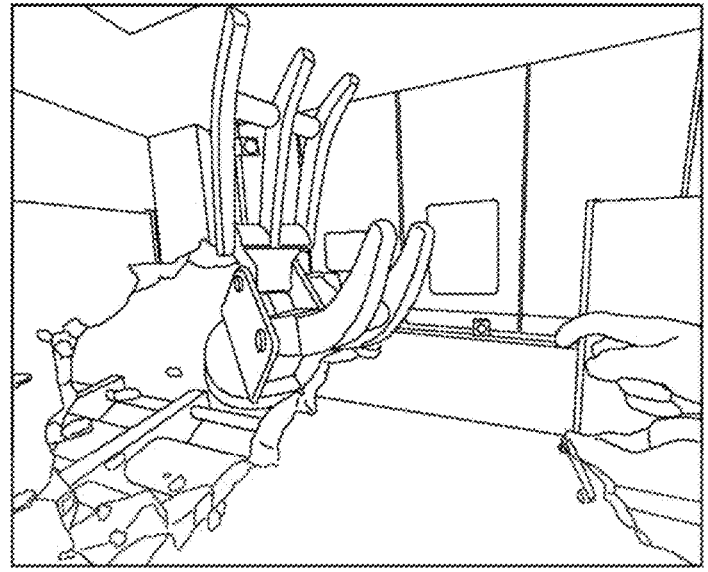

INFORMATION PROCESSING APPARATUS, METHOD, PROGRAM, AND INFORMATION PROCESSING SYSTEM

CROSS REFERENCE TO RELATED APPLICATIONS

This is a continuation application of U.S. patent application Ser. No. 18/001,094, accorded a filing date of Dec. 8, 2022 (allowed); which is a national stage application of International Application No. PCT/JP2021/022794, filed Jun. 16, 2021; which claims priority to Japanese Patent Application No. 2020-107907, filed Jun. 23, 2020, and to Japanese Patent Application No. 2020-152094, filed Sep. 10, 2020, the entire disclosures of which are hereby incorporated by reference.

TECHNICAL FIELD

The present invention relates to an information processing apparatus, a method, a program, and an information processing system.

BACKGROUND ART

In recent years, a technology has been examined by which a movement of a body and a space are shared on a real time basis by a plurality of users who are present in remote places spaced away from each other in such a manner as to allow the users to have such an experience that they feel as if they were in the same place. For example, a technology called Telexistence provides an environment in which an operation and so forth are performed on a real time basis while a user is allowed to feel, through a head-mounted display or the like, as if something or some person in a remote place were present near the user.

SUMMARY

Technical Problem

For the technology described above, it is demanded to provide a novel viewing experience to a user.

Taking the problem described above into consideration, it is one of objects of the present invention to provide a novel viewing experience to a user.

Solution to Problem

In order to solve the problem described above, an information processing apparatus of one aspect of the present invention includes an acquisition unit that acquires space information indicative of a position of a physical object in a first space around a first user, a space construction unit that constructs, on the basis of the space information, a shared space that is shared by the first user and a second user who exists in a second space different from the first space and in which the position of the physical object in the first space is reflected, and a determination unit that determines a position of the second user in the shared space.

It is to be noted that any combinations of the foregoing as well as the components and representations of the present invention as they are converted between methods, apparatuses, programs, transitory or non-transitory storage media in which a program is stored, systems, and so forth are also effective as aspects of the present invention.

Advantageous Effect of Invention

According to the present invention, a novel viewing experience can be provided to the user.

BRIEF DESCRIPTION OF DRAWINGS

FIG. 2 depicts an example of utilization of an embodiment by a user.

FIG. 3 is a functional block diagram of the information processing system.

FIG. 5 is a sequence diagram depicting a flow of processing in the information processing system.

FIG. 6A exemplifies an AR space video displayed by the HMD of the user A.

DESCRIPTION OF EMBODIMENTS

First Embodiment

Figure 1:
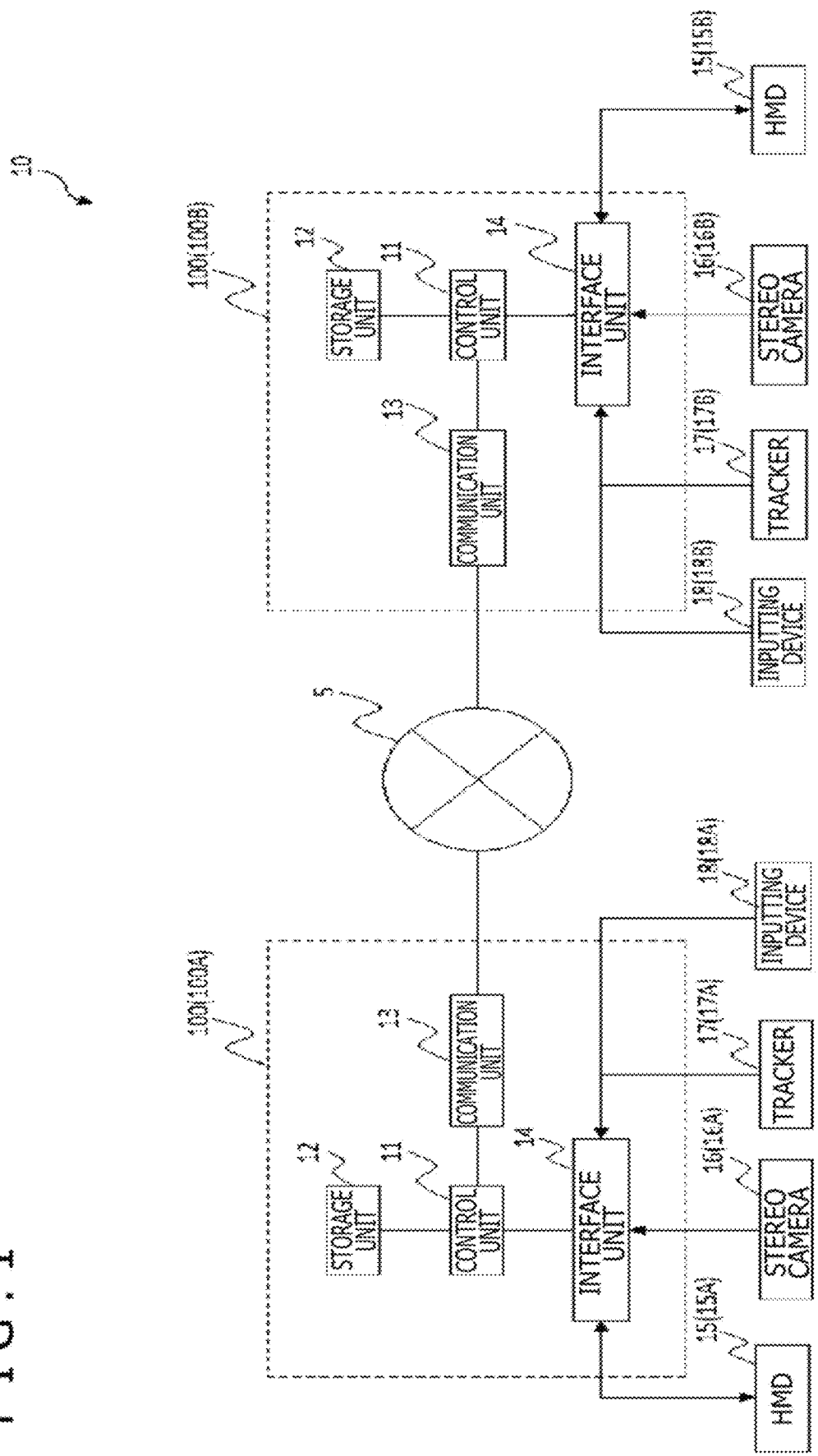
FIG. 1 is an overview diagram of an information processing system.

FIG. 1 is an overview diagram of an information processing system 10 according to an embodiment. The information processing system 10 of FIG. 1 includes a plurality of information processing terminals 100. The plurality of information processing terminals 100 are individually connected for data communication to each other through a communication network 5 such as the Internet. The information processing system 10 of the present embodiment includes two information processing terminals, i.e., an information processing terminal 100A used by a user A and another information processing terminal 100B used by a user B. However, the information processing system 10 is not limited to this and may include three or more information processing terminals 100.

The information processing terminals 100A and 100B each include a control unit 11, a storage unit 12, a communication unit 13, and an interface unit 14. The information processing terminals 100A and 100B are each connected to a head-mounted display (HMD) 15, a stereo camera 16, a tracker 17, and an inputting device 18. The control unit 11 includes a processor and executes a program stored in the storage unit 12 to execute various kinds of information processing. The storage unit 12 includes a memory device such as a random access memory (RAM) and stores a program to be executed by the control unit 11 and data to be processed by the program. The communication unit 13 is a communication interface for performing data communication through the communication network 5. In the present embodiment, the information processing terminals 100A and 100B communicate with each other through P2P (peer-to-peer) connection via the respective communication units 13. The P2P connection establishes a low-latency, high picture quality, and bidirectional communication path in comparison with connection between a server 200 hereinafter described and an information processing terminal 100.

The interface unit 14 is an interface for data communication among the HMD 15, the stereo camera 16, the tracker 17, and the inputting device 18. The information processing terminals 100 are each connected to the HMD 15, the stereo camera 16, the tracker 17, and the inputting device 18 by wired or wireless connection via the interface unit 14. In particular, the interface unit 14 includes a multimedia interface such as the high-definition multimedia interface (HDMI) (registered trademark) that is a standard for a communication interface for transmission of a video and sound using digital signals. Further, the interface unit 14 includes a data communication interface such as a universal serial bus (USB) interface in order to receive video signals transmitted from the stereo camera 16.

The HMD 15 is a viewing device that is mounted on the head of a user to allow the user to appreciate a still image or a moving image displayed on a display of the viewing device and listen to sound or music outputted from headphones. The HMD 15 has a gyro sensor and an acceleration sensor provided therein. The HMD 15 uses the sensors to measure positional information of the head of the user wearing the HMD 15 and a rotational angle, a tilt, and so forth of the head. The HMD 15 has a camera unit incorporated therein. The HMD 15 can capture an image of the external world by using the camera unit while the HMD is worn by the user.

The stereo camera 16 includes a plurality of imaging elements arranged in a lined up relation with each other. By analyzing images captured by the imaging elements, the information processing terminal 100 can measure a distance from an imaging position to a physical object existing within a range of a field of view of the stereo camera 16. Consequently, the information processing terminal 100 can estimate a position and a shape of a physical object existing in a space around the stereo camera 16. In the present embodiment, the stereo camera 16 includes, in the range of the field of view thereof, the user and physical objects such as a floor and a wall existing around the user and is used to specify positions of them.

The tracker 17 includes sensors such as an inertial sensor, a geomagnetic sensor, an acceleration sensor, and a motion sensor and can detect a position and a posture of a body part of the user. The inputting device 18 includes a plurality of inputting devices such as a plurality of operation buttons, an analog stick capable of inputting an analog amount, and so forth. The inputting device 18 supplies operation information inputted by the user through the inputting devices to the control unit. The inputting device 18 includes a plurality of inputting devices such as a plurality of push-type operation buttons, an analog stick capable of inputting an analog amount, and a rotational button.

By estimating the posture and the position of the whole body of the users A and B on the basis of detection data of the HMD 15, the stereo camera 16, and the tracker 17, posture information of the users A and B is generated individually. The posture information of the users A and B is reflected on a shared space hereinafter described which is shared by the users A and B.

FIG. 2 depicts an example of utilization of the present embodiment by users. As depicted in FIG. 2, the users A and B exist in spaces different from each other in the real world. In particular, the user A exists in a first space 1, and the user B exists in a second space 2 different from the first space 1. The HMDs 15A and 15B are mounted on the heads of the users A and B, respectively. The first space 1 and the second space 2 in the present embodiment are rooms of the users A and B, respectively.

In the present embodiment, the HMD 15A of the user A mainly functions as a video see-through type HMD capable of capturing a video of the external world with use of the camera unit incorporated therein and displaying the video on a display panel. The video see-through type HMD can generate and display a video of augmented reality (AR) (AR space video) by superimposing a virtual object generated by computer graphics (CG) on the video of the external world. It is to be noted that, in a case where an avatar of the user A falls from a floor face of the shared space, for example, the HMD 15A in the present embodiment can function as a non-see-through type HMD capable of displaying a video of virtual reality (VR) (VR space video) separated from the real world as hereinafter described.

In the present embodiment, the HMD 15B of the user B is a non-see-through type HMD capable of displaying a VR space video on a display panel thereof. The non-see-through type HMD displays, if the user B turns the head, a VR space video of an overall circumference over 360 degrees.

The stereo cameras 16A and 16B are disposed in front of the respective users A and B. The stereo cameras 16A and 16B include, in the ranges of their fields of view, the users A and B, floor faces on which the users A and B stand, wall faces of the rooms in which the users A and B are present, and so forth, respectively.

The tracker 17A is mounted on both hands of the user A, and the tracker 17B is mounted on both hands and both feet of the user B. While an example in which the trackers are mounted on both hands and both feet of the users is described here, the trackers 17 may be mounted only on the hands or the feet, or otherwise the trackers 17 may be mounted on other body parts such as the trunk. The inputting devices 18A and 18B are held by both hands of the respective users A and B.

In the present embodiment, two spaces, i.e., the first space 1 and the second space 2 that is at a place spaced from the first space 1, are coupled by a shared space hereinafter described, to thereby provide both of the users A and B with such an experience that they can interact as if they were present at the same place (in the first space 1 on the user A side). For example, by providing such an experience that the user A and the user B feel as if an avatar of the user B who is not present in the first space 1 were present in the first space 1, it is possible to allow the user A and the user B to enjoy interaction and communication therebetween.

On the user A side, a video see-through experience with an AR space video is provided. For example, the user A can destroy a virtual object simulating a real wall in the AR space video by performing interaction in which the body of the user A is used. Further, in the AR space video, the avatar of the user B looks as if it were present at the place and can perform communication using the body such as a gesture.

On the user B side, an experience with a VR space video is provided. For example, the user B can enter, as the body of the avatar thereof, the room of the user A (first space 1) in the VR space video. Also the user B can similarly destroy a virtual object simulating a real wall in the VR space video by performing interaction in which the body of the user B is used. Further, in the VR space video, the body of the avatar of the user B can be made larger and smaller in size.

FIG. 3 is a functional block diagram of the information processing system 10 according to the present embodiment.

The functional blocks of the figures including FIG. 3 can be implemented in various forms by hardware only, by software only, and or by a combination of them. The information processing terminal 100A includes a first acquisition unit 51, a space construction unit 52, a space updating unit 53, and a first drawing unit 54. The information processing terminal 100B includes a second acquisition unit 55, a provision unit 56, and a second drawing unit 57.

The first acquisition unit 51 acquires space information indicative of positions, colors, and textures of physical objects in the first space 1 around the user A. The "physical objects" here include not only the floor, walls, a ceiling, and articles (table and so forth) in the space in which the user is present but also the body itself of the user. The first acquisition unit 51 is an example of an acquisition unit. The second acquisition unit 55 acquires shared space information and space update information hereinafter described.

The first acquisition unit 51 and the second acquisition unit 55 acquire posture information indicative of the posture of the respective users A and B. As described hereinabove, the posture information is generated on the basis of the detection data of the HMD 15, the stereo camera 16, and the tracker 17. The first acquisition unit 51 and the second acquisition unit 55 acquire operation information indicative of a desired operation of the respective users in response to an operation input made by the respective users A and B. The operation information is generated on the basis of an operation input made through the inputting device 18.

The space construction unit 52 constructs a shared space on which the positions of physical objects in the first space 1 are reflected on the basis of the space information. The space construction unit 52 generates shared space information indicative of a position coordinate system (hereinafter referred to as a shared coordinate system) of the constructed shared space.

The space updating unit 53 updates the shared space on the basis of the space information as well as the posture information and the operation information of the users A and B. As a result, the position for the user B in the shared space is determined. The space updating unit 53 generates space update information indicative of a state of the updated shared space. The space updating unit 53 is an example of a determination unit.

The provision unit 56 provides the posture information and the operation information of the user B acquired by the second acquisition unit 55 to the first acquisition unit 51. The first drawing unit 54 and the second drawing unit 57 each draw an appearance in the shared space with use of a video generated using the space update information and cause the appearance to be displayed on the HMD 15. At this time, the first drawing unit 54 and the second drawing unit 57 specify, on the shared coordinate system, the position of the head of the respective users A and B who view the shared space image thus displayed and dispose virtual cameras at the specified positions. Then, the first drawing unit 54 and the second drawing unit 57 draw an appearance obtained when the inside of the shared space is viewed from the disposed virtual cameras. Consequently, each of the users A and B can view the appearance in the shared space together with the other user who is present at a remote place.

Figure 4A:
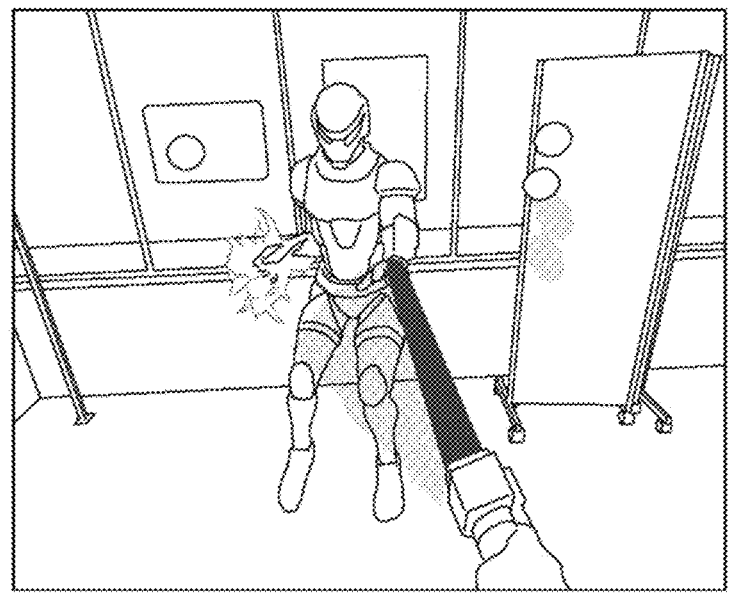
FIG. 4A exemplifies an AR space video displayed by an HMD of a user A.
Figure 4B:
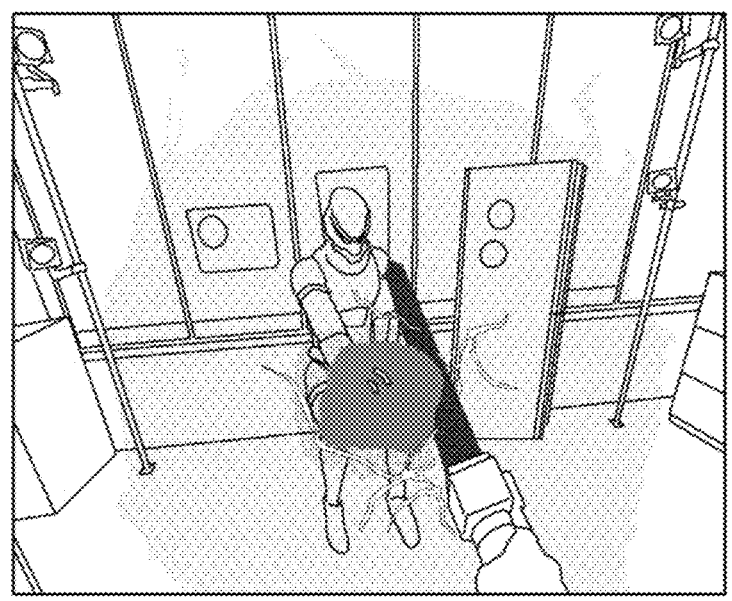
FIG. 4B exemplifies another AR space video displayed by the HMD of the user A.

FIGS. 4A and 4B exemplify AR space videos displayed by the HMD 15A of the user A. In the example of FIG. 4A, a virtual object of a sword is superimposed at a hand of the user A in the AR space video. Further, in the AR space video, a virtual object of a humanoid avatar of the user B is superimposed at a middle portion of the room. Therefore, displayed through the AR space video on the HMD 15A of the user A is an appearance in which the user A is fighting against the humanoid avatar of the user B displayed at the middle portion of the drawing, with the sword held by the user A on the near side in the drawing, in the room in which the user A is present (first space 1). In the example of FIG. 4B, the user A is being attacked by the avatar of the user B.

A flow of processing by the information processing terminals 100A and 100B according to the present embodiment is described with reference to a sequence diagram of FIG. 5. In the present embodiment, the information processing terminal 100A of the user A functions as a server.

First, in S11, the information processing terminal 100A establishes connection to the information processing terminal 100B. In the present embodiment, the information processing terminal 100A connects to the information processing terminal 100B by P2P connection through the communication network 5. In the present embodiment, the information processing terminal 100A issues a notification of game participation acceptance, approves a game play request from the information processing terminal 100B, and then establishes P2P connection to the information processing terminal 100B.

In S12, the first acquisition unit 51 acquires space information indicative of the position, color, and texture of a physical object in the first space 1 around the user A. In the present embodiment, the first acquisition unit 51 analyzes an image captured by the stereo camera 16A to specify the position, color, and texture of the physical object existing in an imaging range of the stereo camera 16A. The first acquisition unit 51 acquires the space information on the basis of the specified position, color, and texture of the physical object.

In particular, the first acquisition unit 51 calculates, for each of a plurality of unit regions obtained by dividing the imaging range of the stereo camera 16 in a grid pattern, the distance to a portion of an imaging target captured in the unit region. By this, the first acquisition unit 51 can acquire a distance image (depth map) including information of the distance to the physical object captured in each unit region. In the following description, a portion of a physical object existing in the real space, which portion is captured in a unit region in the distance image, is referred to as a unit portion.

The first acquisition unit 51 uses numerical values of the position of each unit region in the distance image (that is, a direction of the unit region as viewed from an installation position of the stereo camera 16) and the distance to the unit portion captured in the unit region to calculate position coordinates of the unit portion in the real space. The position coordinates are three-dimensional position coordinates on a coordinate system in which the installation position of the stereo camera 16 is a reference position. By using the individual position coordinates of the plurality of unit portions obtained in this manner, the position and shape of a physical object having a complicated structure such as the body of the user or a table are specified. Further, for the position coordinates of each of the plurality of unit portions obtained in this manner, the color and the texture are specified on the basis of the captured image.

The space information includes floor face information that designates the floor face in the first space 1. In the present embodiment, the first acquisition unit 51 generates the floor face information by determining a flat plane configured from a unit portion existing at the lowest position as the floor face.

In S13, the space construction unit 52 constructs a shared space on the basis of the space information. In S13, the space construction unit 52 constructs a shared coordinate system on the basis of the position coordinates specified in the space information, in such a manner that the position of the physical object in the first space 1 is reflected. Further, in the shared coordinate system, a floor face of the shared space is set on the basis of the floor face information included in the space information, in such a manner that the floor face of the shared space corresponds to the floor face of the first space 1. It is to be noted that, in a space outside the space corresponding to the first space 1 in the shared space, a predetermined virtual object (for example, such a virtual object that represents the cosmic space) is disposed. In the present embodiment, an initial position of the user B is set to a predetermined position in the space corresponding to the first space 1 in the shared space.

In S14, the space construction unit 52 generates shared space information indicative of the shared coordinate system of the constructed shared space and provides the generated shared space information to the information processing terminal 100B.

In S15, the second drawing unit 57 generates a VR space video on the basis of the shared space information, in such a manner that the constructed shared space is reflected. The second drawing unit 57 generates and draws the VR space video in such a manner that, on the basis of the shared coordinate system, a floor face of the second space 2 is adjusted to coincide with the floor face set in the shared space and that the walls, the ceiling, and the articles are formed with reference to the floor face. By displaying the VR space video in this manner, the user B can confirm the state of the user B in the shared space with use of the VR space video. The user B can execute an operation input on the basis of the VR space video in which only the position of the physical object is reflected.

In S16, the first acquisition unit 51 acquires the space information of the first space 1 and the posture information and the operation information of the user A and acquires the posture information and the operation information of the user B provided thereto via the provision unit 56 of the information processing terminal 100B. Here, the operation information can include motion information for causing, for example, the avatar of a user to perform a specific motion (for example, shooting a bullet, drawing a sword, or the like). Further, in a case where an HMD for a VR space video like the HMD 15B of the user B is used, the operation information further includes movement information for causing the avatar of the user to move to a desired position in the shared space and scale information for setting a scale for the avatar of the user. The scale information includes a scale value for adjusting the scale of the avatar of the user.

In S17, the space updating unit 53 updates the shared space on the basis of the space information of the first space 1 and the posture information and the operation information of the users A and B acquired in S16. In particular, the space updating unit 53 determines, for each unit portion, the position, shape (including size), color, and texture of the virtual object in the shared space. The virtual object in the present embodiment is, for example, the floor, the walls, the ceiling, the articles, the avatars of the users A and B, the sword, the bullet, or the like. It is to be noted that each of the virtual objects of the floor, the walls, the ceiling, and the articles in the shared space is configured from an aggregate of fragments, so that it can be destroyed.

The space updating unit 53 determines the position and the posture of the user A in the shared space on the basis of the space information and the posture information of the user A in such a manner that the position and the posture of the user A in the shared space correspond to the position and the posture at present of the user A in the first space 1. The space updating unit 53 updates the position and the posture of the virtual object of the avatar of the user A in the shared space on the basis of the determined position and posture of the user A.

The space updating unit 53 determines the posture of the user B in the shared space on the basis of the posture information of the user B in such a manner that the posture of the user B in the shared space corresponds to the posture at present of the user B, and determines the position of the user B in the shared space to the position designated by the movement information. Further, in the present embodiment, the space updating unit 53 determines the size of the virtual object of the avatar of the user B in the shared space on the basis of the scale information of the user B. For example, in a case where the designated scale is different from the scale at present on the basis of the scale value of the scale information, the space updating unit 53 changes the size to increase or decrease the scale of the avatar of the user B in the shared space. The space updating unit 53 updates the position, posture, and scale of the virtual object of the avatar of the user B in the shared space on the basis of the determined position, posture, and scale of the user B.

The space updating unit 53 determines the position, color, and texture of each of the floor, the walls, the ceiling, and the articles in the shared space on the basis of the space information in such a manner that the position, color, and texture of each of the floor, the walls, the ceiling, and the articles in the first space 1 at present are reflected. The space updating unit 53 updates the position, color, and texture of each of the virtual objects of the floor, the walls, the ceiling, and the articles in the shared space on the basis of the determined position, color, and texture of the floor, the walls, the ceiling, and the articles.

In the present embodiment, the space updating unit 53 determines, on the basis of the space information and the posture information and the operation information of the users A and B, whether or not a virtual object relating to the avatar of at least one of the users A and B is brought into contact with a first space virtual object that forms the space corresponding to the first space 1 in the shared space. Here, the virtual object relating to the avatar in the present embodiment is a virtual object that is operated by the avatar such as a predetermined body part (arm or the like) of the avatar, a sword held by the avatar, or a bullet shot by the avatar. Further, the first space virtual object in the present embodiment is a virtual object that forms the floor, walls, ceiling, and articles corresponding to the first space 1 in the shared space. However, this is not restrictive, and the first space virtual object may be a virtual object that forms at least one of the floor, walls, ceiling, and articles corresponding to the first space 1 in the shared space. The first space virtual object includes a plurality of virtual objects that are fragments of the same.

In a case where it is determined that the virtual object relating to the avatar is brought into contact with the first space virtual object, the space updating unit 53 changes the state of the contact portion of the first space virtual object. This change of the state includes, for example, destruction, bursting into flames, freezing, or coloring of the contact portion of the first space virtual object. In a case where the change of the state is, for example, destruction of the contact portion of the first space virtual object, the space updating unit 53 changes the state of the contact portion of the virtual object in such a manner that the contact portion of the virtual object disappears in the shared space.

In the present embodiment, in a case where the first space virtual object corresponding to the floor face of the shared space is destroyed and at least one of the avatars of the users A and B is positioned at the destroyed portion of the floor face, the space updating unit 53 determines the position of the user relating to the avatar positioned at the destroyed portion of the floor face in the shared space in such a manner that the avatar falls from the position of the destroyed floor face.

Further, in a case where it is determined that, for example, a virtual object of a sword held by the avatar of one of the users is brought into contact with a virtual object of a bullet shot from the other user, the space updating unit 53 generates a virtual object in such a manner as to perform a specific motion such as bouncing back the bullet. As a result of such interactions performed among the users A and B and the virtual objects in the shared space as described above, the virtual objects are increased or decreased or changed in appearance in S19A and S19B hereinafter described.

In S18, the space updating unit 53 provides the generated space update information to the first drawing unit 54 and also to the information processing terminal 100B.

In S19A, the first drawing unit 54 draws an AR space video on the basis of the space update information in such a manner that the updated shared space is reflected. In S19A, the first drawing unit 54 draws the virtual objects obtained when the updated shared space is viewed from a viewpoint position and a view direction of the user A wearing the HMD 15A. In the present embodiment, the first drawing unit 54 lays down, according to the positions of the floor, walls, ceiling, and articles in the first space 1 within the field of view of the HMD 15A, the virtual objects of the fragments of them, to thereby draw a first space virtual object in such a manner that the floor, walls, ceiling, and articles of the first space 1 are reflected in the shared space. The first drawing unit 54 superimposes, by a post process, a captured image (video see-through image) of the floor, walls, ceiling, and articles captured by the HMD 15 on a surface of the generated first space virtual object of the floor, the walls, the ceiling, and the articles. Here, the "surface of the first space virtual object" is a face of the first space virtual object obtained when it is viewed from within the space corresponding to the first space 1 in the shared space. The first drawing unit 54 draws an AR space video by superimposing the virtual objects of the avatar of the user B, a sword, and so forth on the captured image superimposed on the virtual objects, on the basis of the space update information.

In a case where the first space virtual object (wall or the like) is destroyed, the virtual objects of the fragments laid down at the destroyed portion of the virtual object are broken into pieces and disappear. As a result, it becomes possible for the first drawing unit 54 to draw, for the disappearing portion, a virtual object existing on a far side in the view direction of the user A. Further, a texture image indicating a cross section obtained when a wall or the like is destroyed is pasted to a destruction cross section of the virtual objects of the fragments which have been broken into pieces. In addition, as described hereinabove, on the surface of the first space virtual object, the captured image (video see-through image) of the HMD 15 is superimposed by the post process. As a result, if the first space virtual object of a wall or the like is destroyed, then the image indicated by the virtual objects of the fragments changes from the video see-through image to a predetermined texture image that indicates the destroyed state. This enables such presentation that the wall or the like at the contact portion looks as if it were destroyed actually. In this case, for the video see-through image, a texture image generated from the captured image captured by the HMD 15 may be used or otherwise the captured image may be used as it is.

In a case where the avatar of the user A is positioned at the destroyed portion of the floor face in the shared space, the position of the user A in the shared space is determined in such a manner that the avatar of the user A falls from the position of the destroyed floor face. In this case, the HMD 15A of the user A displays a VR space video in which a space outside the space corresponding to the first space 1 in the shared space is reflected, due to the falling of the avatar of the user A from the space corresponding to the first space 1 in the shared space.

In S19B, the second drawing unit 57 draws a VR space video on the basis of the space update information, in such a manner that the updated shared space is reflected. In S19B, the second drawing unit 57 draws a VR space video by generating, on the basis of the space update information, virtual objects obtained when the updated shared space is viewed from a viewpoint position and a view direction of the user B wearing the HMD 15B. In particular, the second drawing unit 57 draws a VR space video by generating virtual objects in such a manner that the floor, the walls, the ceiling, the articles, the avatar of the user A, the sword, and so forth are reflected in the shared space. For example, the second drawing unit 57 draws a VR space video in such a manner that the surface of the first space virtual object indicates an image in which the color and texture of the floor, walls, ceiling, and articles of the first space 1 are reflected. In a case where the virtual objects of the fragments of the contact portion disappear as described above, the second drawing unit 57 draws, for the disappearing portion, a virtual object existing on the far side in the view direction of the user B.

If the first space virtual object is destroyed, then an image indicated by the virtual objects of the fragments changes from the image in which the color and texture of the destroyed portion are reflected to a texture image indicative of the destroyed state. As a result, such presentation as if the wall or the like at the contact portion were actually destroyed becomes possible. It is to be noted that S19A and S19B are executed at the same time.

Thereafter, the information processing system 10 repeatedly executes the processes from S16 to S19A and S19B. In particular, the information processing system 10 repeatedly executes acquisition of space information of the first space 1, acquisition of posture information and operation information of each of the users A and B, and updating and drawing of the shared space according to the acquired pieces of information. By this, an appearance of the shared space in which the avatars reflecting a movement of the body and so forth of the users A and B exist can be presented to the users A and B.

The processing of the information processing terminals 100A and 100B is completed accordingly.

According to the present embodiment, it becomes possible for each of the users A and B to interact with the user present in the other space, with use of a shared space in which physical objects in the room of the user A are reflected. Therefore, a novel experience can be provided to the users.

In the present embodiment, the position of the user B is determined in a space corresponding to the first space 1 in the shared space. As a result, to the user A, an AR space video is drawn in such a manner that the avatar of the user B appears in the room of the user A itself, and to the user B, a VR space video is drawn as if the user B were present in the room of the user A. Therefore, it becomes possible to provide an experience with more immersive and realistic feelings to the users A and B.

In the present embodiment, the space updating unit 53 determines a scale for an avatar of a user in the shared space on the basis of scale information. According to the present configuration, it becomes possible to change the scale of the avatar of each user in the shared space. Therefore, since the users A and B can interact, with the avatars different in scale from each other in the shared scale, it becomes possible to provide a more novel experience.

In the present embodiment, the space construction unit 52 sets the floor face of the shared space in such a manner that the floor face of the shared space corresponds to the floor face of the first space 1. Since this causes the floor face of the user A and the floor face of the user B to coincide with each other, the users A and B can have such a feeling that they can perform interaction in the same room.

In the present embodiment, the space information indicates the color and texture of a physical object in addition to the position of the physical object. According to this configuration, since a video closer to the actual room of the user A (first space 1) is obtained, it becomes possible to provide an experience with a more realistic feeling.

In the present embodiment, in a case where a virtual object relating to the avatar of at least one of the users A and B is brought into contact with a first space virtual object, the state of the contact portion of the first space virtual object is changed. According to the present configuration, since specific presentation is performed for a wall or the like of the actual room of the user A, it becomes possible to provide an experience with a more realistic feeling.

In the present embodiment, in a case where a first space virtual object corresponding to the floor face of the shared space is destroyed and at least one of the avatars of the user A and the user B is positioned at the destroyed portion of the floor face, the position of the user relating to the avatar in the shared space is determined in such a manner that the avatar positioned at the destroyed portion of the floor face falls from the position of the destroyed floor face. According to the present configuration, it becomes possible to provide, to the user, such a novel experience that the user feels as if the user fell in error from the actual room of the user A.

In the present embodiment, the surface of the first space virtual object indicates an image indicative of physical objects in the first space 1 (for example, a video see-through image or an image in which the color and texture of the physical objects are reflected), and the destruction cross section of the first space virtual object indicates a predetermined texture image indicative of the destroyed state. According to the present configuration, since such presentation as if the room of the user A were destroyed actually becomes possible, it is possible to provide a more novel experience.

In the following, modifications are described. While, in the present embodiment, the HMD 15A functions principally as a video see-through type HMD and the HMD 15B functions as a non-see-through type HMD, this is not restrictive. Each of the HMDs 15A and 15B may function as either a video see-through type HMD or a non-see-through type HMD.

While, in the present embodiment, the position of the floor of the first space 1 on the user A side and the position of the floor of the second space 2 on the user B side are made to coincide with each other, this is not restrictive. For example, any one of the floor, a wall, and the ceiling on one user side may be made to coincide with the floor, a wall, or the ceiling on the other user side.

While, in the present embodiment, the information processing terminal 100A functions as a server, this is not restrictive. For example, the information processing terminal 100B may function as a server. While, in the present embodiment, the space information indicates the position, color, and texture of a physical object in the first space 1, this is not restrictive. It is sufficient if the space information indicates at least the position of a physical object in the first space 1. While, in the present embodiment, the space information indicates the position, color, and texture of a physical object, this is not restrictive. It is sufficient if the space information indicates at least the position of a physical object. While, in the present embodiment, operation information is inputted through the inputting device 18, this is not restrictive. Operation information may be inputted otherwise in response to any motion of a user such as a gesture.

Second Embodiment

In the following, a second embodiment of the present invention is described. In the drawings and the description of the second embodiment, components and members identical or equivalent to those of the first embodiment are denoted by identical reference signs. Description overlapping that of the first embodiment is omitted suitably, and a configuration different from that of the first embodiment is described intensively.

In the first embodiment described above, a shared space is constructed in such a manner that the avatar of the user B appears in a space corresponding to the first space 1 in the shared space. In contrast, in the second embodiment, a shared space is constructed in such a manner that the avatar of the user B appears outside the space corresponding to the first space 1 in the shared space. In particular, a shared space is constructed in such a manner that the first space 1 of the user A appears in the second space 2 of the user B.

Figure 6B:
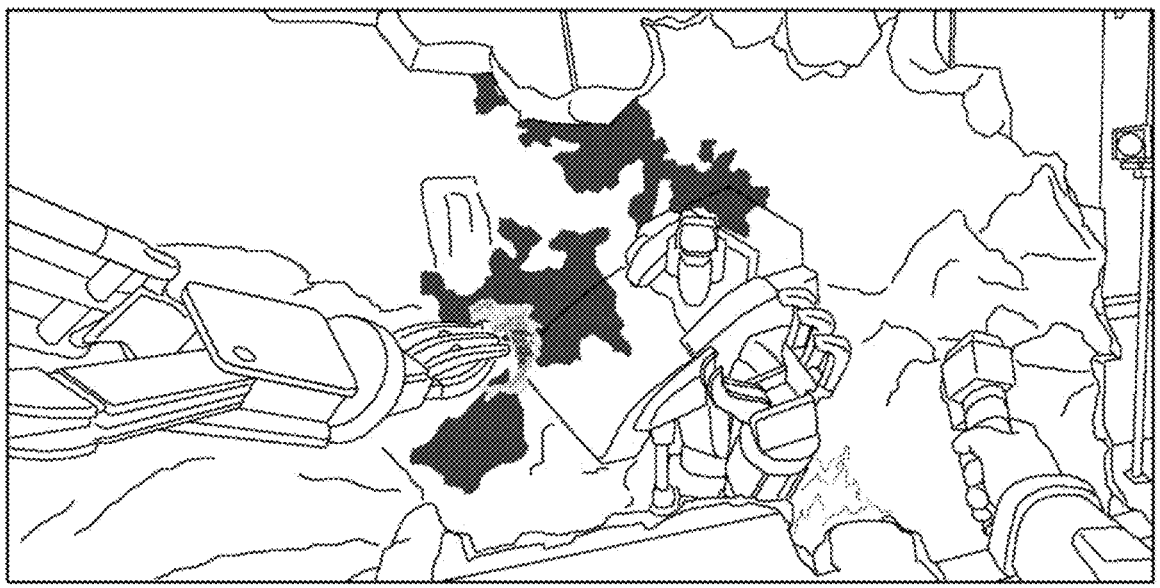
FIG. 6B exemplifies another AR space video displayed by the HMD of the user A.

FIGS. 6A and 6B exemplify AR space videos displayed by the HMD 15A of the user A. In the example of FIG. 6A, the user B is represented not as a humanoid avatar but as an avatar of a huge robot. In this example, the robot avatar of the user B is scaled in such a manner that it has a height of approximately 10 m in the AR space video. Further, part of a wall of the room of the user A is indicated by a virtual object having a mode in which it seems to have been destroyed. As a result, on the HMD of the user A, an appearance is displayed in which, when an arm of the robot of the user B is brought into contact with the wall of the room of the user A from the outside of the room, the robot arm destroys the wall of the room and advances into the room of the user A. In the example of FIG. 6B, an appearance in which most part of the room of the user A has been destroyed by the robot avatar of the user B is represented.

Figure 7:
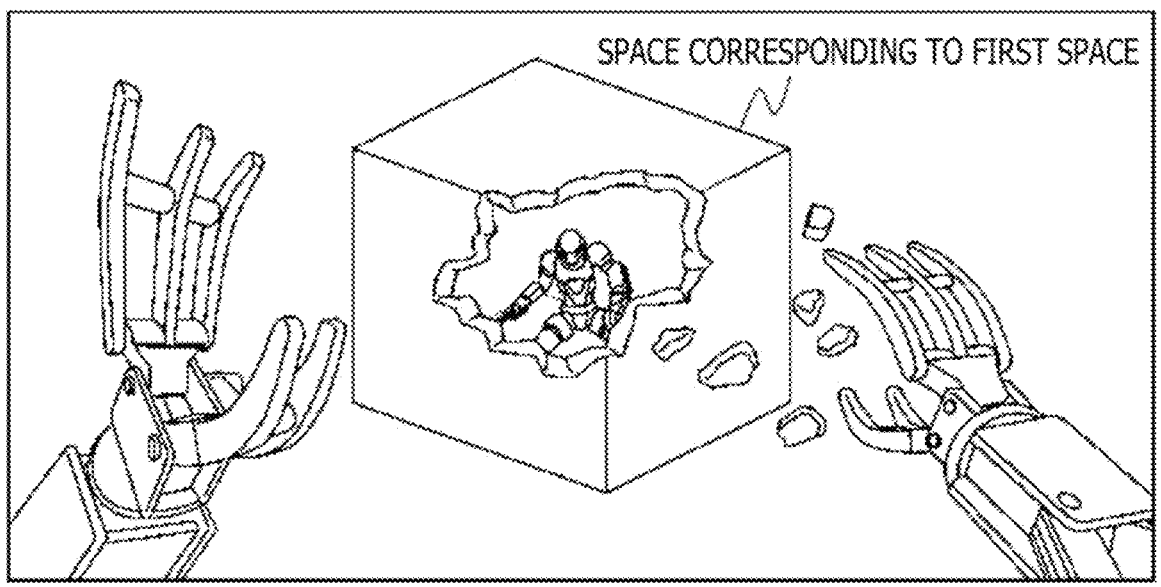
FIG. 7 exemplifies an AR space video displayed by an HMD of a user B.

In the present embodiment, the HMD 15B of the user B is a video see-through type HMD that can superimpose a virtual object on a video of the external world to generate and display an AR space video. FIG. 7 exemplifies an AR space video displayed by the HMD 15B of the user B. In the example of FIG. 7, both hands of the user B are represented with virtual objects of robot arms superimposed thereon on the near side in the drawing in the AR space video. Further, the wall of a mesh indicating the room of the user A (first space) is partly destroyed, and the avatar of the user A can be seen through the destroyed portion. Since the scale of the avatar of the user B is great, the room of the user A is reflected to be small in the AR space video.

Figure 8:
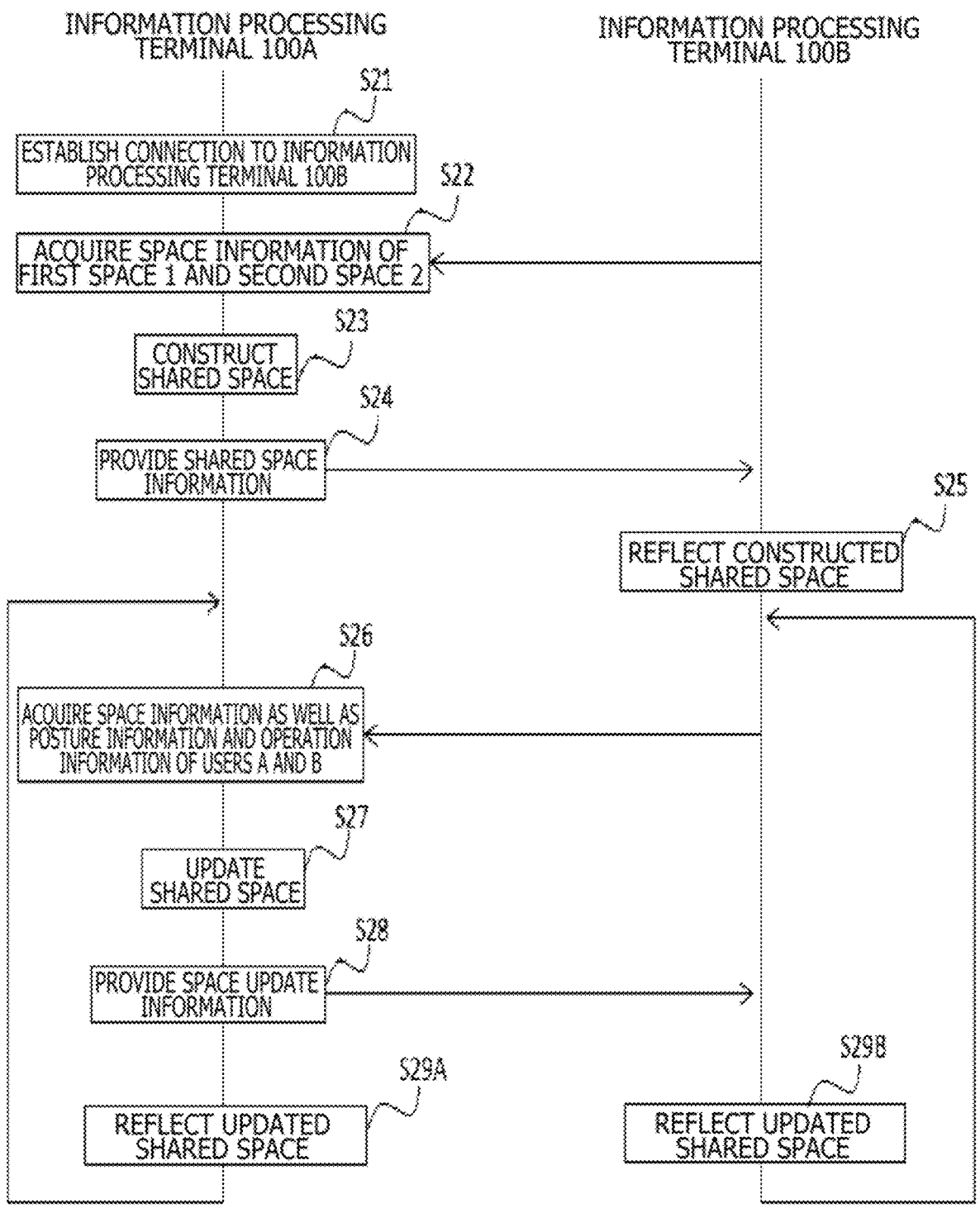
FIG. 8 is a sequence diagram depicting a flow of processing in the information processing system.

According to the present embodiment, the user A can perform interaction, in the room of the user A, with the avatar of the user B coming in from the outside of the room, and the user B can perform interaction, in the room of the user B, with the avatar of the user A that is in the room of the user A. Therefore, it becomes possible to provide an experience with a more realistic feeling. In the following, processing in the present embodiment is described with reference to FIG. 8.

In S22, the first acquisition unit 51 acquires space information of the first space 1 and further acquires space information of the second space 2 which information indicates the position of physical objects in the second space 2. The space information of the second space 2 is provided via the provision unit 56 of the information processing terminal 100B. In the present embodiment, the second acquisition unit 55 of the information processing terminal 100B acquires the space information of the second space 2 with use of the stereo camera 16B by a technique similar to that for the space information of the first space 1. The provision unit 56 provides the acquired space information of the second space 2 to the information processing terminal 100A. The space information of the second space 2 includes floor face information indicative of the floor face of the second space 2.

In S23, the space construction unit 52 constructs a shared space on the basis of the space information of the first space 1 and the space information of the second space 2. In S23, the space construction unit 52 constructs a shared space on the basis of the position coordinates of the first space 1 and the second space 2 specified in the respective pieces of space information, in such a manner that a space corresponding to the first space 1 is located at a predetermined position in a space corresponding to the second space 2 in the shared space. In the present embodiment, the space corresponding to the second space 2 in the shared space has its scale set in such a manner that the space can accommodate the space corresponding to the first space 1. In the space corresponding to the first space 1, the position of physical objects in the first space 1 is reflected. The shared coordinate system in the present embodiment is set on the basis of the floor face information included in the respective pieces of space information, in such a manner that the floor face of the space corresponding to the first space 1 and the floor face of the space corresponding to the second space become horizontal to each other. In the present embodiment, the initial position of the user B is set to a predetermined position outside the space corresponding to the first space 1 in the shared space.

In S25 after S24, the second drawing unit 57 generates an AR space video on the basis of the shared space information in such a manner that the shared space is reflected. In this AR space video, a box-shaped virtual object representing the first space is superimposed at a predetermined position in the second space 2. It is to be noted that the position of the box-shaped virtual object representing the first space may be changed on the basis of operation information of the second user (for example, to a position on a table or the like). In S29B after S26 to S28, the second drawing unit 57 generates an AR space video on the basis of the space update information in such a manner that the updated shared space is reflected.

Thereafter, the information processing system 10 repeatedly executes the processes from S26 to S29A and S29B. In particular, the information processing system 10 repeatedly executes acquisition of space information of the first space 1, acquisition of posture information and operation information of each of the users A and B, and updating and drawing of the shared space according to the acquired pieces of information.

The processing of the information processing terminals 100A and 100B is completed accordingly.

Third Embodiment

In the following, a third embodiment of the present invention is described. In the drawings and the description of the third embodiment, components and members identical or equivalent to those of the first embodiment are denoted by identical reference signs. Description overlapping that of the first embodiment is omitted suitably, and a configuration different from that of the first embodiment is described intensively.

Figure 9:
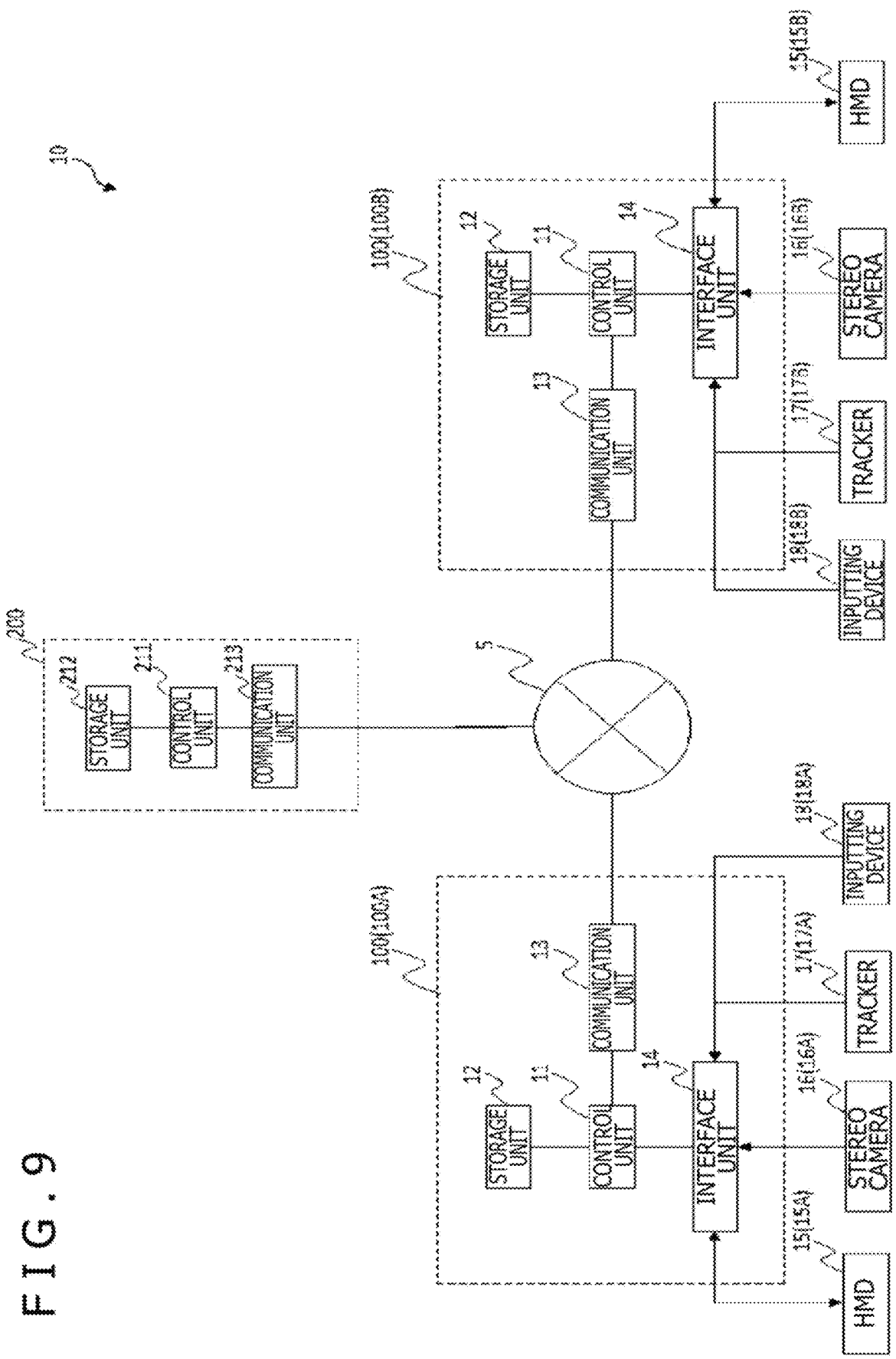
FIG. 9 is an overview diagram of the information processing system.

The information processing system 10 of FIG. 9 includes a server 200 and a plurality of information processing terminals 100. The server 200 is connected for data communication to the plurality of information processing terminals 100 through a communication network 5. The server 200 includes a control unit 211, a storage unit 212, and a communication unit 213.

The control unit 211 includes a processor and executes a program stored in the storage unit 212 to execute various kinds of information processing. The storage unit 212 includes a memory device such as a RAM and stores a program to be executed by the control unit 211 and data to be processed by the program. The communication unit 213 is a communication interface for performing data communication through the communication network 5. In the present embodiment, each of the information processing terminals 100 and the server 200 communicate with each other through client-server type connection via the communication units 13 and 213.

Figure 10:
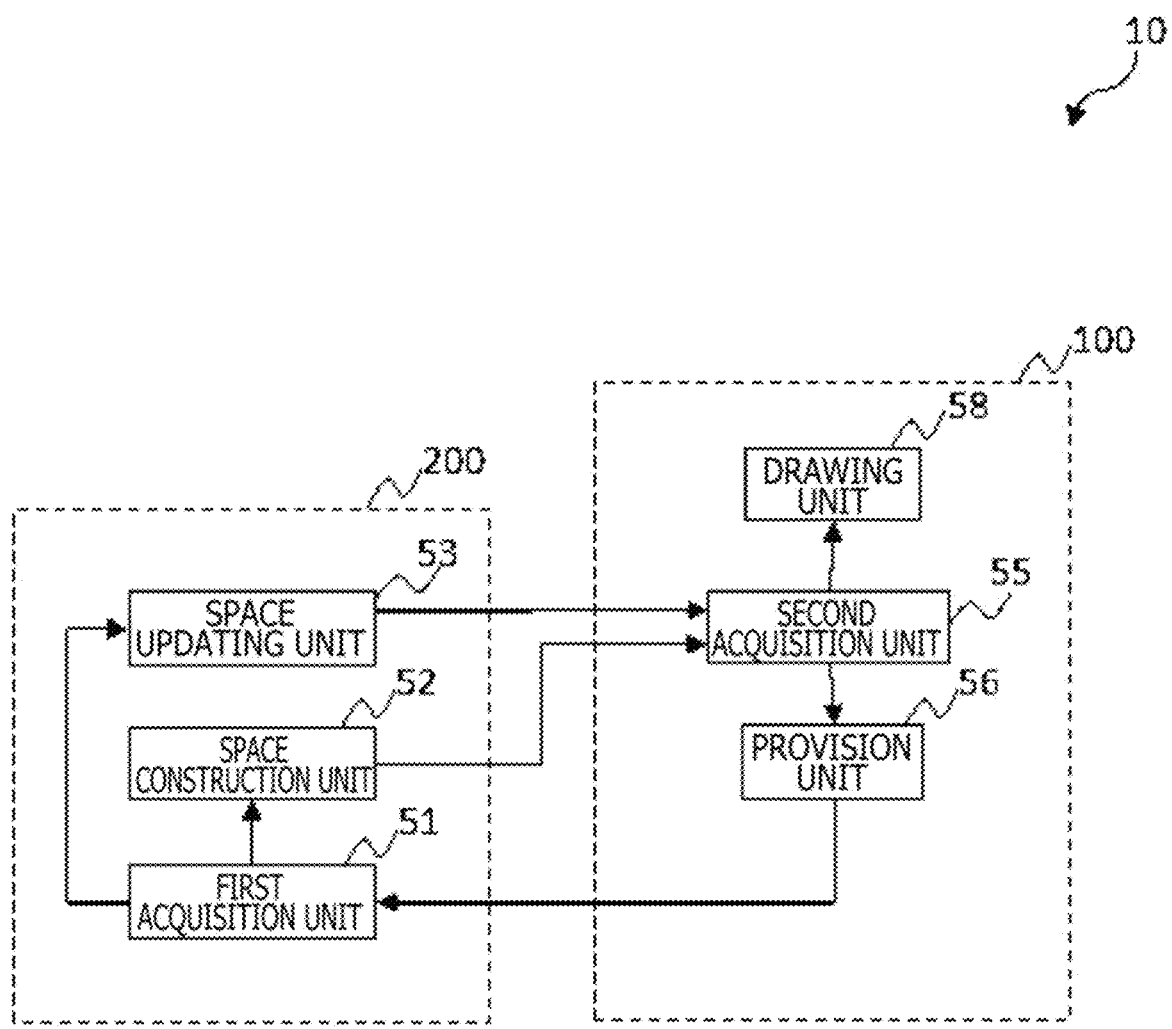
FIG. 10 is a functional block diagram of the information processing system.

FIG. 10 is a functional block diagram of the information processing system 10 according to the present embodiment. As depicted in FIG. 10, the server 200 includes a first acquisition unit 51, a space construction unit 52, and a space updating unit 53. The information processing terminals 100 each include a second acquisition unit 55, a provision unit 56, and a drawing unit 58. It is to be noted that the drawing unit 58 has a function similar to that of the first drawing unit 54 and the second drawing unit 57. The first acquisition unit 51 and the second acquisition unit 55 in the present embodiment are examples of a server side acquisition unit and a terminal side acquisition unit, respectively.

Figure 11:
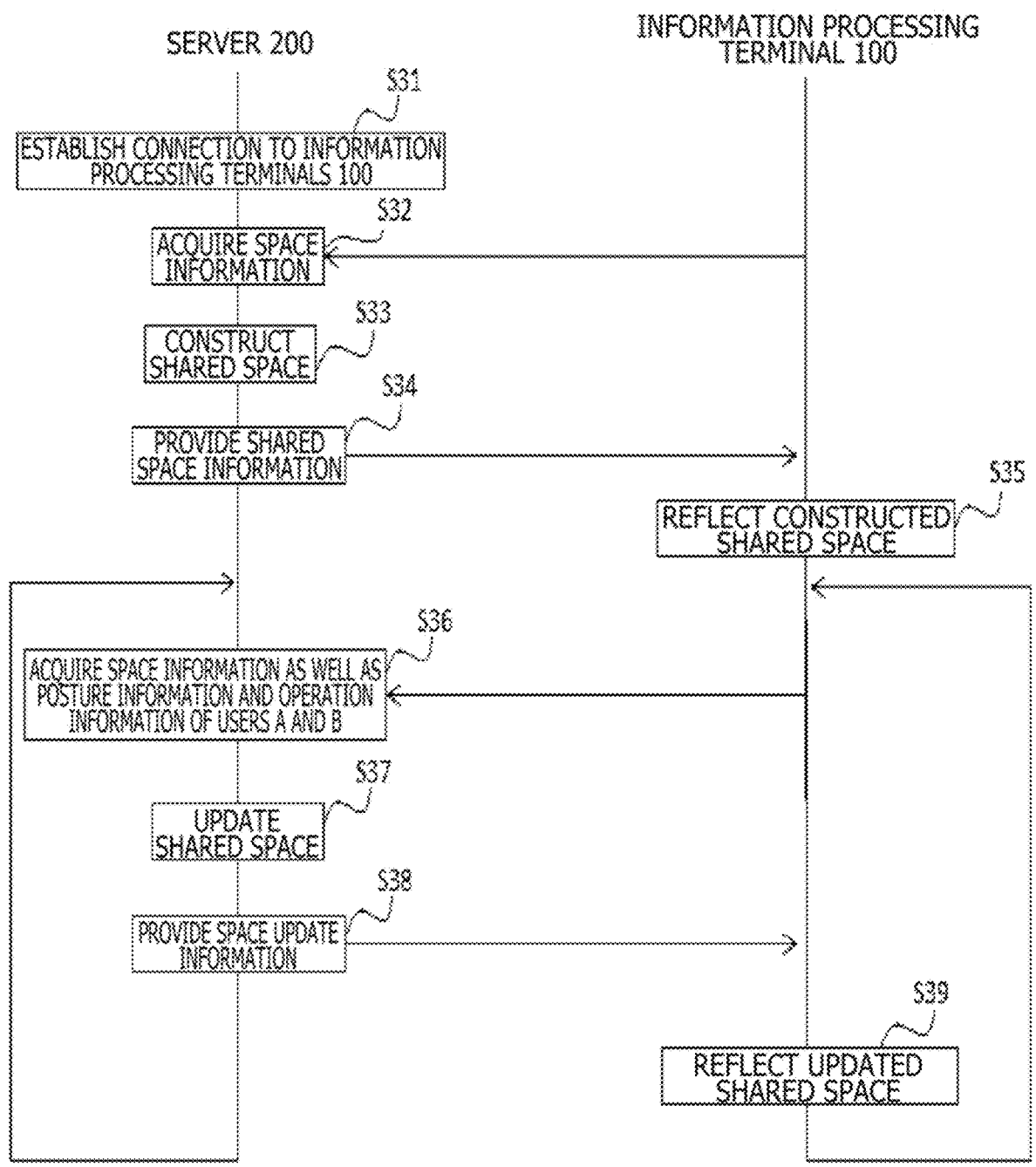
FIG. 11 is a sequence diagram depicting a flow of processing in the information processing system.

A flow of processing by the information processing terminals 100 and the server 200 according to the present embodiment is described with reference to a sequence diagram of FIG. 11. In S31, the server 200 establishes connection to each of the information processing terminals 100. In the present embodiment, the server 200 establishes client-server type connection to each of the information processing terminals 100 through the communication network 5.

In S32, the first acquisition unit 51 acquires space information from the information processing terminals 100. In the present embodiment, the first acquisition unit 51 acquires space information from at least one of the information processing terminals 100A and 100B via the provision unit 56.

In S33, the space construction unit 52 constructs a shared space on the basis of the acquired space information. In the present embodiment, the shared space is constructed using the space information of the information processing terminal 100 (in the present embodiment, referred to as the information processing terminal A) designated in advance. In S37 after S34 to S36, the space updating unit 53 updates the shared space on the basis of the space information of the first space 1 in the information processing terminal 100A and posture information and operation information of the users A and B, which pieces of information have been acquired in S36. In S38, the space updating unit 53 provides space update information to the information processing terminals 100A and 100B. In S39, the drawing units 58 of the information processing terminals 100A and 100B individually draw an AR space video or a VR space video on the basis of the space update information acquired via the second acquisition unit 55, in such a manner that the updated shared space is reflected.

Thereafter, the information processing system 10 repeatedly executes the processes from S36 to S39. The processing of the information processing terminals 100 and the server 200 is completed accordingly.

The present invention has been described on the basis of the embodiments. The embodiments are exemplary, and it will be recognized by those skilled in the art that various modifications can be made in the combination of the components and the processes in the embodiments and that also such modifications fall within the scope of the present invention.

Industrial Applicability

The present invention relates to an information processing apparatus, a method, a program, and an information processing system.

REFERENCE SIGNS LIST

1: First space
2: Second space
5: Communication network
10: Information processing system
11: Control unit
12: Storage unit
13: Communication unit
14: Interface unit
15: HMD
16: Stereo camera
17: Tracker
18: Inputting device
51: First acquisition unit
52: Space construction unit
53: Space updating unit
54: First drawing unit
55: Second acquisition unit
56: Provision unit
57: Second drawing unit
58: Drawing unit
100: Information processing terminal
200: Server

The invention claimed is:

1. An information processing apparatus comprising:
   circuitry configured to:
   acquire space information indicative of a position of a physical object in a first physical space around a first user;
   construct, on a basis of the space information, a shared virtual space in which movements of the first user in the first physical space and movements of a second user who exists in a second physical space are reflected, a physical area associated with the second physical space being different from a physical area associated with the first physical space; and
   determine a position of the second user in a section of the shared virtual space, the section of the shared virtual space corresponding to the first physical space, wherein at least one of the following holds true:
   (i) the space information is further indicative of a color and a texture of the physical object in the first physical space, and wherein the circuitry is further configured to determine a color and a texture of a virtual object such that the color and the texture of the virtual object reflects the color and texture of the physical object in the first physical space; and
   (ii) in a case where a virtual object relating to an avatar of at least one of the first user and the second user is brought into contact with a contact portion of a first space virtual object that forms the section of the shared virtual space, the circuitry is further configured to change a state of the contact portion of the first space virtual object.

2. The information processing apparatus according to claim 1, wherein the position of the second user within the section of the shared virtual space is determined based on the movement of the second user in the second physical space.

3. The information processing apparatus according to claim 1, wherein the circuitry is further configured to determine a size of an avatar of the second user in the shared virtual space.

4. The information processing apparatus according to claim 1, wherein the shared virtual space is shared by the first user and the second user, and wherein the position of the physical object in the first physical space is reflected in the section of the shared virtual space.

5. The information processing apparatus according to claim 1, wherein the space information includes floor face information that designates a floor face in the first physical space, and wherein the circuitry is further configured to determine a position of another virtual object based on the floor face information.

6. The information processing apparatus according to claim 1, wherein the circuitry is further configured to:
   acquire different space information indicative of a position of a second physical object in the second physical space; and
   construct the shared virtual space further on a basis of the different space information such that the section of the shared virtual space is positioned in another section of the shared virtual space corresponding to the second physical space.

7. The information processing apparatus according to claim 1, wherein the circuitry is further configured to:
   acquire scale information for setting a scale for an avatar of at least one of the first user and the second user in the shared virtual space; and
   determine the scale for the avatar on a basis of the scale information.

8. The information processing apparatus according to claim 1, wherein the space information includes floor face information that designates a floor face in the first physical space, and wherein the circuitry is further configured to set a floor face of the shared virtual space on a basis of the floor face information in such a manner as to correspond to the floor face of the first physical space.

9. The information processing apparatus according to claim 1, wherein the change of the state is destruction of the contact portion of the first space virtual object, and, in a case where at least one of the avatars of the first user and the second user is positioned at the destroyed contact portion, the circuitry is further configured to determine a position of the user relating to the avatar positioned at the destroyed contact portion in such a manner that the avatar falls from the position of the destroyed contact portion.

10. The information processing apparatus according to claim 1, wherein:
the change of the state of the contact portion of the first space virtual object is destruction of the contact portion of the first space virtual object,
the first space virtual object includes a plurality of virtual objects that are fragments thereof,
a surface of the first space virtual object indicates an image that indicates the physical object in the first physical space, and
a destruction cross section of the first space virtual object indicates a predetermined texture image indicating a destroyed state.

11. A method comprising:
acquiring space information indicative of a position of a physical object in a first physical space around a first user;
constructing, on a basis of the space information, a shared virtual space in which movements of the first user in the first physical space and movements of a second user who exists in a second physical space are reflected, a physical area associated with the second physical space being different from a physical area associated with the first physical space; and
determining a position of the second user in a section of the shared virtual space, the section of the shared virtual space corresponding to the first physical space, wherein at least one of the following holds true:
(i) the space information is further indicative of a color and a texture of the physical object in the first physical space, and the determining includes determining a color and a texture of a virtual object such that the color and the texture of the virtual object reflects the color and texture of the physical object in the first physical space; and
(ii) in a case where a virtual object relating to an avatar of at least one of the first user and the second user is brought into contact with a contact portion of a first space virtual object that forms the section of the shared virtual space, a state of the contact portion of the first space virtual object is changed.

12. A non-transitory, computer readable storage medium containing a computer program, which when executed by a computer, causes the computer to perform a method, comprising:
acquiring space information indicative of a position of a physical object in a first physical space around a first user;
constructing, on a basis of the space information, a shared virtual space in which movements of the first user in the first physical space and movements of a second user who exists in a second physical space are reflected, a physical area associated with the second physical space being different from a physical area associated with the first physical space; and
determining a position of the second user in a section of the shared virtual space, the section of the shared virtual space corresponding to the first physical space, wherein at least one of the following holds true:
(i) the space information is further indicative of a color and a texture of the physical object in the first physical space, and the determining includes determining a color and a texture of a virtual object such that the color and texture of the virtual object reflects the color and texture of the physical object in the first physical space; and
(ii) in a case where a virtual object relating to an avatar of at least one of the first user and the second user is brought into contact with a contact portion of a first space virtual object that forms the section of the shared virtual space, a state of the contact portion of the first space virtual object is changed.

13. An information processing system comprising:
a server; and
a plurality of information processing terminals configured to;
acquire space information indicative of a position of a physical object in a first physical space around a first user;
construct, on a basis of the space information, a shared virtual space in which movements of the first user in the first physical space and movements of a second user who exists in a second physical space are reflected, a physical area associated with the second physical space being different from a physical area associated with the first physical space; and
determine a position of the second user in a section of the shared virtual space corresponding to the first physical space, wherein at least one of the following holds true:
(i) the space information is further indicative of a color and a texture of the physical object in the first physical space, and the plurality of information processing terminals are further configured to determine a color and a texture of a virtual object such that the color and texture of the virtual object reflects the color and the texture of the physical object in the first physical space; and
(ii) in a case where a virtual object relating to an avatar of at least one of the first user and the second user is brought into contact with a contact portion of a first space virtual object that forms the section of the shared virtual space, the plurality of information processing terminals are further configured to change a state of the contact portion of the first space virtual object.

* * * * *